Patented Apr. 14, 1931

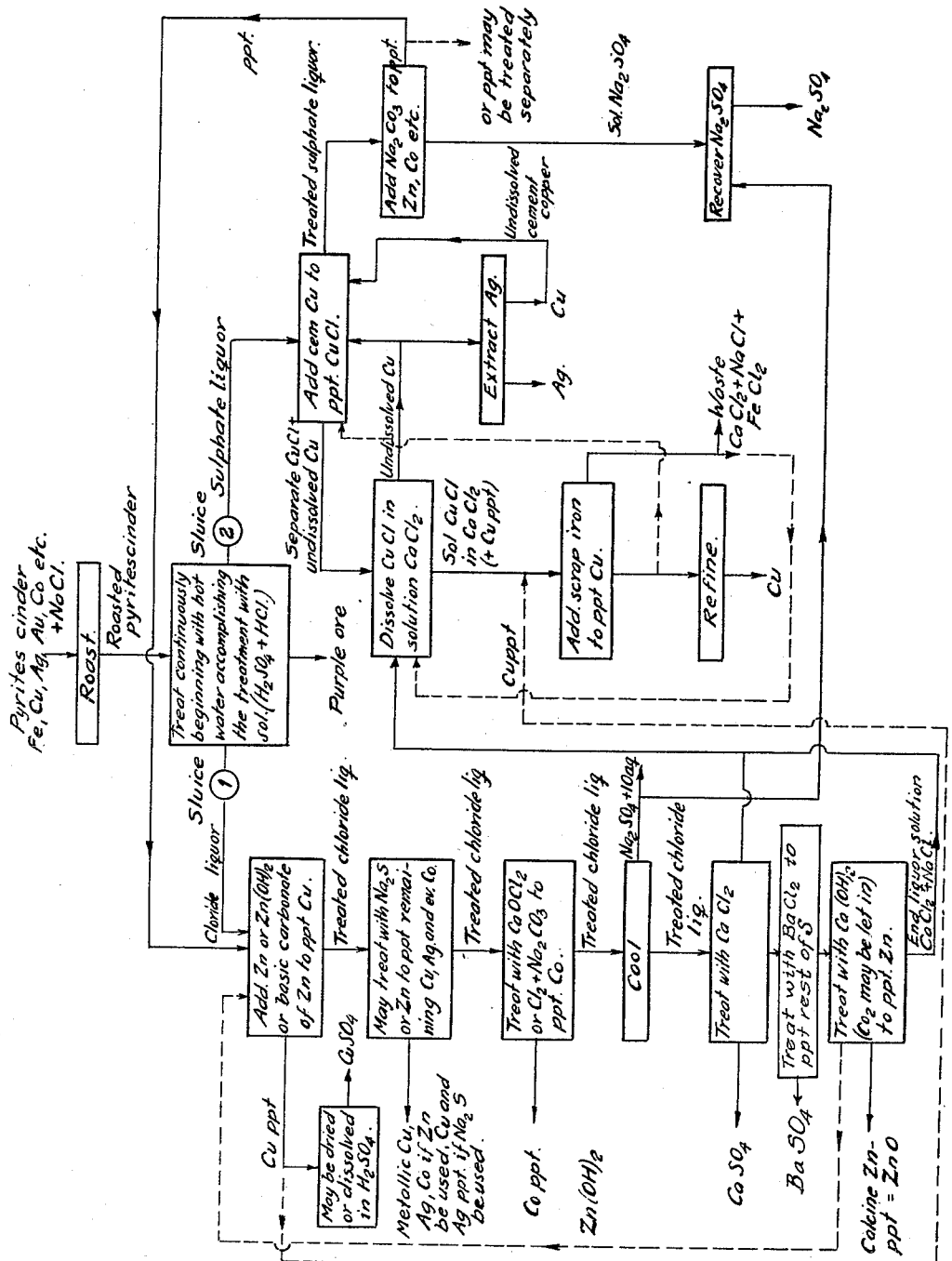

1,800,761

UNITED STATES PATENT OFFICE

AXEL GUSTAF SUNDBERG, OF HALSINGBORG, SWEDEN, ASSIGNOR TO REYMERSHOHNS GAMLA INDUSTRI AKTIEBOLAG, OF HALSINGBORG, SWEDEN

METHOD OF UTILIZING THE LIQUORS OBTAINED BY SUBJECTING PYRITES CINDER TO CHLORIDIZING ROASTING AND LIXIVIATING THE ROASTED MATERIAL

Application filed October 15, 1926, Serial No. 141,889, and in Sweden October 24, 1925.

The present invention relates to methods of utilizing the liquors obtained by subjecting pyrites cinder and the like to a chloridizing roasting process and lixiviating the roasted material thus obtained.

Since the chloridizing roasting process gained ground in the technics for the recovery of copper from pyrites cinders and the like, a number of different methods have been proposed for treating the liquors obtained on lixiviating the roasted ore for the purpose of recovering, in addition to copper, also other valuable constituents present in said liquors, as for instance zinc, silver, cobalt, sulphur, etc. However, the methods hitherto proposed have not found any practical use for the reason that they could not be carried out economically, the copper having usually been precipitated by cementation, that is to say by means of iron in the form of iron scrap or the like, whereby the decoppered liquor would contain considerable quantities of ferrous salts which has rendered it difficult to extract other valuable constituents of the liquor.

The cementation by means of iron involves considerable drawbacks. Thus if the copper be precipitated with iron a solution is obtained in which the quantity of iron ion is equivalent to the quantity of copper precipitated. Prior to further treatment of this solution in order to recover the different constituents contained therein the iron must be removed. This is a very difficult, circumstantial and costly procedure and has rendered uneconomical most of the previously suggested methods of treating liquors from pyrites cinder in order to recover zinc, etc. A study of works on this subject will show that none of the hitherto known methods has succeeded to eliminate the disadvantageous influence of iron in the same simple and efficient way as the present invention.

The main object of the present invention is to provide a method whereby, in addition to copper, other valuable constituents of the liquors can be economically recovered and, consequently, great values be saved which could not hitherto be utilized.

Another object of the invention is to avoid the use of iron for the precipitation of the copper but to use for this purpose a reagent other than iron, for instance a reducing agent such as metallic zinc or a zinc compound or the like.

Another object of the invention is to facilitate the recovery of valuable metals other than copper by reducing the volume of liquor from which said metals are to be recovered.

Still another object of the invention is to produce an extremely pure sodium sulphate from the liquor.

Other objects of the invention will be clearly understood from the following specification in which an embodiment of the method forming the subject matter of the present invention will be more closely described. It is, however, to be observed, that the processes for the recovery of the constituents set forth therein are not the only ones according to which the invention may be carried out, but that said processes may be modified in different manners without departing from the spirit of the invention.

In the accompanying drawing there is illustrated in flow sheet form, a representation of the various process steps to be hereinafter described.

The roasted material is usually first lixiviated with water preferably heated to a temperature of about 50° to 60° centigrade, and then with diluted acids, usually a mixture of hydro-chloric acid and sulphuric acid obtained from the waste gases formed in the chloridizing roasting process.

The lixiviation takes place in vats or basins which are filled with ore one after the other. Lixiviant is continually pumped into the vat, penetrates through the charge to the bottom of the vat and is continuously drawn off. The lixiviation is thus a discontinuous process in the sense that the ore is lixiviated in charges but is continuous in the sense that every charge is lixiviated continuously when lixiviation of the charge has really begun. When lixiviating in lixiviation vats for instance water is pumped onto the vat for a certain period of time, and then diluted acids. The lixiviation of chloridizing roasted pyrites cinder will result first in a liquor containing a comparatively large quantity of chlorides and later in a liquor containing a comparatively large quantity of sulphates. This depends not on the nature of the lixiviant but is due to the fact that the chlorides of the metals present are considerably more soluble than the sulphates.

In practice the lixiviation and the separation of the liquor is effected in the following manner:

The liquor first obtained from the vat is let into a chloride liquor tank. One can tell from experience how large a quantity of chloride liquor is obtained, that is, when communication to the chloride liquor tank should be closed and the rest of the washings let into the sulphate liquor tank. When all the liquor has been drawn off the copper and chloride content of the sulphate liquor is determined by analysis. If for instance the sulphate liquor is found to contain a too small quantity of chlorine some chloride liquor is added to the same. In practice where several liquor tanks are at disposal and the liquors from several lixiviation vats are mixed, it is simpler, if the chlorine ion concentration be too small, to close the communication to the chloride liquor tank when lixiviating the next vat on a somewhat earlier stage than when lixiviating the previous vat, whereby the chlorine ion concentration of the sulphate liquor will be a little increased. If the sulphate liquor of one vat contains too much chlorine the communication to the chloride liquor tank from the next lixiviation vat is closed somewhat later, whereby a sulphate liquor containing less chlorine is obtained. In practice it is thus very simple to regulate the relation between the quantities of chlorine and sulphate liquor which in reality only involves observing that the sulphate liquor will contain the right quantity of chlorine ion in relation to the copper present.

The liquor thus first obtained contains the major portion of the silver and zinc of the roasted product and only a minor portion of the copper, the metals being present mainly in the form of chlorides, whereas the liquor obtained on continued lixiviation contains the major portion of the copper of the roasted product and only a minor portion of silver, zinc, etc., the metals in said liquor being present mainly in the form of sulphates. The percentage of cobalt is approximately the same in the two liquors. For the sake of simplicity said liquors will be called "the chloride liquor" and "the sulphate liquor" respectively.

According to the invention the chloride liquor and the sulphate liquor are separated, the proportion of the chloride liquor in relation to the sulphate liquor being preferably adapted in such a manner that the quantity of chlorine ion in the sulphate liquor is approximately equivalent or somewhat more than equivalent to the quantity of copper present in said liquor, reckoned as cupric chloride. That is, according to the present invention, during the lixiviation the chloride liquor, comprising the first washing of the roasted material, is kept separate from the sulphate liquor comprising subsequent washing. To keep the liquors separate, communication to the chloride liquor is closed when the percentage of sulphur in the washings attains a certain value. Subsequent washings are taken out as sulphate liquor. Thus such a quantity of chloride liquor and of such a chlorine ion concentration is first drawn off that the quantity of chlorine ion in the sulphate liquor remaining after separation of the chloride liquor is equal to the quantity of copper in the sulphate liquor calculated as bivalent copper. If this be the case the entire copper contents of the sulphate liquor can be precipitated as $CuCl$ without any extra addition of other chlorides. On the other hand the chlorine ion quantity should never exceed its equivalence of bivalent copper by too large an amount, $CuCl$ being soluble in the excess. The copper is then precipitated separately from each of the said liquors by any known means but preferably by reagents other than iron in at least one of the liquors. The treatment of the two liquors will be clearly set forth in the following.

*The treatment of the chloride liquor*

Copper is first precipitated from the chloride liquor. This precipitation may be effected according to any known method, but preferably a reagent or reagents other than iron are used for this purpose, for instance metallic zinc or a zinc compound, which zinc or zinc compound may be derived from a preceding stage of the process as will be more closely described in the following. The precipitation may preferably be carried out at a somewhat increased temperature. The precipitate thus obtained is separated by decanting, filtering in a filter press or in any other suitable manner, and is washed with water. If the zinc compound used for the precipitation of the copper consists of zinc hydroxide or basic zinc carbonate, the precipitate obtained will, consequently, mainly consist of copper hydroxide or basic copper carbonate respectively contaminated by basic zinc salts. The precipitate of copper is dried and melted in any suitable manner, or it may be dissolved in sulphuric acid without drying, in order to produce copper sulphate. It is evident that the precipitate may also be treated in any other suitable manner, for instance by dissolution and cementation.

To the filtrate thus obtained which contains zinc, silver, cobalt, sulphur, etc., as valuable constituents, sodium sulphide is added in a quantity corresponding to the percentage of silver and of any remaining copper, whereby silver precipitates together with remaining copper, said precipitate being separated and dried. The product thus obtained is sold under the name of cupriferous silver powder.

The solution obtained after the separation of the silver precipitate is then treated with chloride of lime (bleaching powder) or chlorine and sodium carbonate while supplying heat thereto, whereby cobalt precipitates. The precipitate thus obtained, which is contaminated by zinc, nickel and manganese, is separated, for instance in a filter press, and may then be treated in any suitable manner, for instance for the purpose of recovering metallic cobalt or cobalt oxide.

Instead of using sodium sulphide for the precipitation of silver as well as of any copper remaining in the liquor, said metals may be precipitated in any other appropriate manner, for instance by means of zinc scrap. If this latter reaction is carried out at an increased temperature, for instance at 90° to 100° centigrade, cobalt will also precipitate. By this means, copper, silver and cobalt are obtained in metallic state, which metals may then be separated from each other in any suitable manner.

After copper, silver and cobalt have been extracted from the liquor, a solution of calcium chloride is added to the liquor, whereby the major portion of the sulphur present in the liquor precipitates in the form of pure gypsum, which is separated in any suitable manner and burnt for the purpose of obtaining pure plaster of Paris and the like.

The sulphur in the liquor may also be recovered in another manner by cooling the solution obtained after the separation of copper, silver and cobalt to about 0° centigrade or a couple of degrees below this reading, whereby about two thirds of the sodium sulphate present in the liquor will crystallize. The sodium sulphate is separated, and may then be treated in a manner described below. The quantity of sulphur remaining in the solution is then precipitated in the form of gypsum as described above.

In order to remove remaining sulphate from the liquor a solution of barium chloride is added to same, whereby barium sulphate precipitates and is separated in any appropriate manner. To the remaining solution lime water is added, whereby the zinc precipitates as zinc hydroxide. This precipitate is rather difficult to separate, and for the purpose of facilitating the separation the precipitation is preferably carried out by passing carbon dioxide through the solution, which carbon dioxide may be produced in a lime-kiln in which the lime is produced by roasting limestone. Furthermore, the precipitation is preferably carried out at a somewhat increased temperature whereby a crystalline precipitate of basic zinc carbonate is obtained which may be easily filtered. The precipitate may be washed with water, dried and glowed, the glowing being preferably carried out at so high a temperature that the material is caused to sinter, whereby the percentages of chlorine and sulphur are reduced to a minimum. The zinc oxide obtained represents a material containing about 70% of zinc and is very suitable for the production of metallic zinc or zinc white.

Out of the final liquor obtained after the separation of the zinc precipitate and containing mainly calcium chloride and sodium chloride, gypsum may be recovered. To this end the liquor is evaporated to the desired concentration so that sodium chloride will crystallize, whereupon the gypsum is precipitated.

Part of the zinc compound obtained may be used to precipitate the copper from the chloride liquor. For this purpose the zinc precipitate, either zinc hydroxide or basic zinc carbonate, is preferably used in the undried state, whereby the precipitation of the copper is considerably facilitated, the zinc in said precipitate being in a very active state.

The treatment of the sulphate liquor

From the sulphate liquor which, as previously stated, contains mainly the major portion of the total quantity of copper and only a minor portion of the total quantity of zinc and silver, the copper is first precipitated. This precipitation may be effected in any desired manner, a reagent or reagents other than iron being used for this purpose. For instance, the copper may be precipitated in the form of cuprous chloride by means of a suitable reducing agent. As reducing agent cement copper may be used, preferably such cement copper which has been obtained in a preceding stage of the process.

In order to render the precipitation more complete and to accelerate same, an excess of cement copper is preferably used. The cuprous chloride together with any excess of cement copper are separated from the solution and this product may be treated in any appropriate manner for the purpose of producing metallic copper or any copper compound desired. Preferably a chloride solution is added to the precipitate, whereby the cuprous chloride is dissolved, whereas any excess of undissolved cement copper is separated and returned to the vessel in which the copper of the sulphate liquor is precipitated in the form of cuprous chloride. Now and then said cement copper should be removed from the process, as the same is gradually enriched in impurities. In order to produce metallic copper iron scrap may be added to said solution of cuprous chloride, whereby the copper is precipitated as cement copper in an exceedingly pure state. Part of this cement copper may be used for the reduction of copper from the original sulphate liquor, and the remaining part may be refined in any suitable manner. The solution obtained after the separation of the cement copper is preferably used for dissolving fresh quantities of cuprous chloride. For this purpose the final liquor obtained after the separation of the zinc precipitate may also be used.

The dissolved cuprous chloride may also be treated with lime, the copper then precipitating in the form of cuprous hydroxide. If sulphur dioxide is used as reducing agent, the copper will precipitate in the form of cuprous chloride which may be separated from the solution and treated for the purpose of recovering copper or copper salts, for instance by cementation by means of iron scrap or by precipitation by means of lime.

After the separation of the cuprous chloride a solution is obtained which is now relieved of the major portion of the chlorides and contains mainly sulphates. From said solution all constituents except the sulphate-ion may be precipitated by adding sodium carbonate or other alkaline base or ammonia, said precipitate being then separated, for instance in a filter press.

The precipitate is preferably introduced into the original chloride liquor, so that the zinc, silver, cobalt, etc., of the sulphate liquor may be recovered simultaneously with corresponding metals of the chloride liquor.

As the volume of the sulphate liquor is considerably greater than that of the chloride liquor and said sulphate liquor contains the major portion of the copper of the roasted material but only the minor portion of the zinc, the transfer of the precipitate of zinc, cobalt, etc., obtained from the sulphate liquor into the chloride liquor involves the great advantage that the total quantity of metals other than copper present in the roasted product can be recovered from a reduced volume of liquor, so that such metals can be extracted economically also from the sulphate liquor.

Under certain circumstances the percentage of zinc of said precipitate is sufficient for precipitating the total quantity of copper in the chloride liquor, in which case, consequently, the zinc precipitate obtained from the chloride liquor may be wholly treated for producing metallic zinc or zinc oxide or any other zinc compound, but in other cases an additional quantity of zinc or zinc compound is necessary, which is then preferably taken from the zinc precipitate obtained from the chloride liquor.

After the separation of the precipitate obtained by the addition of sodium carbonate the solution may be treated in any appropriate manner for the purpose of producing crystallized sodium sulphate or sodium sulphate free from water. Preferably the watery sodium sulphate obtained by cooling the chloride liquor is mixed with this solution, so that the sodium sulphate of the chloride liquor may be recovered simultaneously with that of the sulphate liquor for the purpose of producing sodium sulphate free from water. By using reagents other than iron to precipitate the copper the sodium sulphate will be obtained in a very pure state.

In the embodiment of the invention described above two precipitates containing copper are obtained, the one derived from the chloride liquor and the other from the sulphate liquor. As described above these precipitates may be treated separately, but, of course, this causes unnecessary complications in apparatus, unnecessary consumption of power and work, etc. In order to simplify the method, these two precipitates may be dissolved together in a suitable solvent, the copper being then precipitated from the solution thus obtained, for instance by means of cementation.

If the copper is precipitated from the two liquors in the manner described above, it is obtained from the chloride liquor in the form of copper hydroxide or basic copper carbonate and from the sulphate liquor in the form of cuprous chloride, that is to say from the chloride liquor in the form of bivalent compound and from the sulphate liquor in the form of monovalent compound. The precipitates are separated from the liquors and introduced into a chloride solution, for instance the final liquor obtained after the chloride liquor has been relieved of its content of valuable constituents and sulphur. The cuprous chloride dissolves, whereas, to begin with, the copper hydroxide or the basic copper carbonate remains undissolved. Iron scrap is then added to the bath, whereby the dissolved copper precipitates according to the equation:

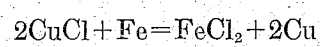

$$2CuCl + Fe = FeCl_2 + 2Cu$$

As soon as some $FeCl_2$ is formed, the copper hydroxide or the basic copper carbonate dissolves also according to the equation:

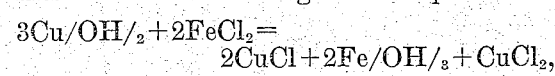

$$3Cu/OH/_2 + 2FeCl_2 = 2CuCl + 2Fe/OH/_3 + CuCl_2,$$

the copper being precipitated by the iron added in the form of cement copper.

In this manner a precipitate is obtained containing metallic copper and iron hydroxide. The last mentioned compound may be dissolved by acidifying the bath, for instance with acid obtained from the waste gases formed in the chloridizing roasting process, but it may also be maintained and separated together with the copper the ferric oxide being useful on refining the copper, as it relieves the copper of arsenic, forming with this element arsenite of iron which goes into the slag.

After the separation of the cement copper a solution is obtained which contains chlorides, mainly ferrous chloride. This solution may also be used to dissolve the precipitates obtained from the chloride liquor and the sulphate liquor from which solution the copper is then precipitated in the manner described above.

What I claim as new and desire to secure by Letters Patent of the United States of America is:—

1. A method of utilizing the liquors obtained by subjecting copper-containing pyrites cinder and the like to chloridizing roasting and lixiviating the roasted material in two stages, the first stage using water as a lixiviant and the second stage using an acid lixiviant, comprising keeping separate the liquor obtained during the first stage and containing salts mainly in the form of chlorides, "the chloride liquor" from the liquor later obtained and containing salts mainly in the form of sulphates, "the sulphate liquor", precipitating the copper separately from each of said liquors, separating the copper precipitates, and precipitating valuable constituents other than copper from the decoppered chloride liquor.

2. A method of utilizing the liquors obtained by subjecting copper-containing pyrites cinder and the like to chloridizing roasting and lixiviating the roasted material in two stages, the first stage using water as a lixiviant and the second stage using an acid lixiviant, comprising keeping separate the liquor obtained during the first stage and containing salts mainly in the form of chlorides, "the chloride liquor" from the liquor later obtained and containing salts mainly in the form of sulphates, "the sulphate liquor", precipitating and separating the copper from the sulphate liquor, precipitating and separating valuable constitutents other than copper from the decoppered sulphate liquor, and mixing said last-mentioned precipitate with the chloride liquor.

3. A method of utilizing the liquors obtained by subjecting copper and zinc containing pyrites cinder and the like to chloridizing roasting and lixiviating the roasted materal in two stages, the first stage using water as a lixiviant and the second stage using an acid lixiviant, comprising keeping separate the liquor obtained during the first stage and containing salts mainly in the form of chlorides, "the chloride liquor" from the liquor later obtained and containing salts mainly in the form of sulphates "the sulphate liquor", precipitating and separating the copper of the sulphate liquor, precipitating and separating valuable constituents other than copper which include zinc from the de-coppered sulphate liquor, precipitating the copper of the chloride liquor by means of said last-mentioned precipitate, separating this copper precipitate from the solution, and precipitating valuable constituents other than copper from said solution, said constituents deriving from both said liquors.

4. A method of utilizing the liquors obtained by subjecting copper-containing pyrites cinder and the like to chloridizing roasting and lixiviating the roasted material in two stages, the first stage using water as a lixiviant and the second stage using an acid lixiviant, comprising keeping separate the liquor obtained during the first stage and containing salts mainly in the form of chlorides, "the chloride liquor" from the liquor later obtained and containing salts mainly in the form of sulphates, "the sulphat liquor", precipitating the copper separately from each of said liquors, dissolving jointly the copper precipitates in a chloride solution, and precipitating the copper from the solution.

5. A method of utilizing the liquors obtained by subjecting copper-containing pyrites cinder and the like to chloridizing roasting and lixiviating the roasted material in two stages, the first stage using water as a lixiviant and the second stage using an acid lixiviant, comprising keeping separate the liquor obtained during the first stage and containing salts mainly in the form of chlorides, "the chloride liquor" from the liquor later obtained and containing salts mainly in the form of sulphates, "the sulphate liquor", preciptating the copper separately from each of said liquors, dissolving jointly the copper preciptates in a suitable solvent, preciptating the copper from the solution by cementation, separating the cement copper and using the solution thus obtained with the addition of acid to dissolve further quantities of copper precipitates.

6. A method of utilizing the liquors obtained by subjecting copper-containing pyrites cinder and the like to chloridizing roasting and lixiviating the roasted material in two stages, the first stage using water as a lixiviant and the second stage using an acid lixiviant, comprising keeping separate the liquor obtained during the first stage and containing salts mainly in the form of chlorides, "the chloride liquor" from the liquor later obtained and containing salts mainly in the form of sulphates, "the sulphate liquor", precipitating the copper separately from each of said liquors, said precipitation being effected from the chloride liquor by means of iron-free reagent, separating the copper precipitates, and precipitating valuable constituents other than copper from the decoppered chloride liquor.

7. A method as described in claim 6, said precipitation being effected from the chloride liquor by means of zinc or zinciferous material, separating the copper precipitates and precipitating valuable constituents other than copper from the decoppered chloride liquor.

In testimony whereof I affix my signature.

AXEL GUSTAF SUNDBERG.